Sept. 23, 1969 T. T. JONES, JR 3,468,085
MULTIPURPOSE GUY STAKE
Filed Sept. 14, 1967
2 Sheets-Sheet 1
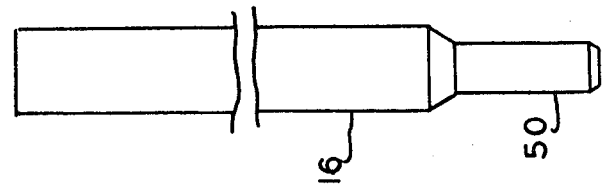
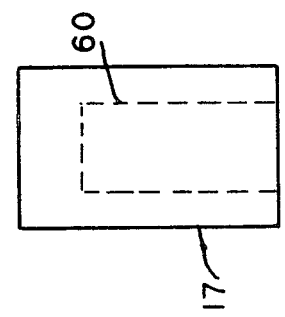
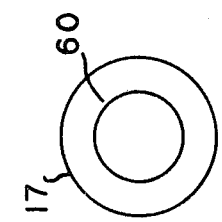
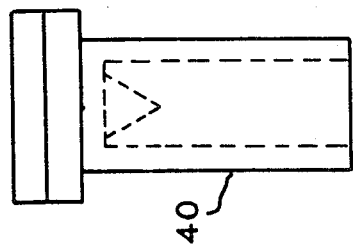
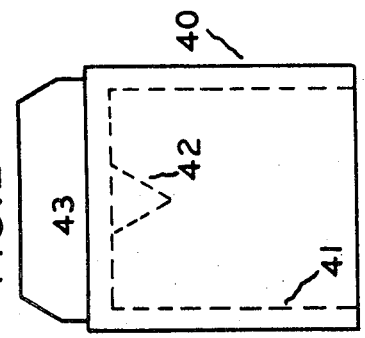
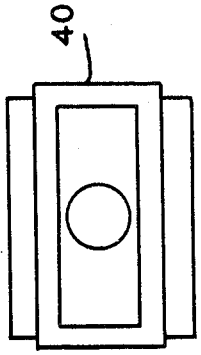
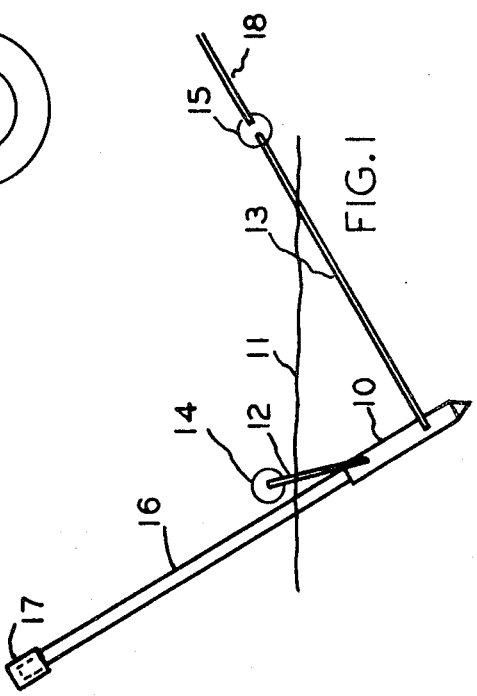

Sept. 23, 1969     T. T. JONES, JR     3,468,085
MULTIPURPOSE GUY STAKE
Filed Sept. 14, 1967     2 Sheets-Sheet 2
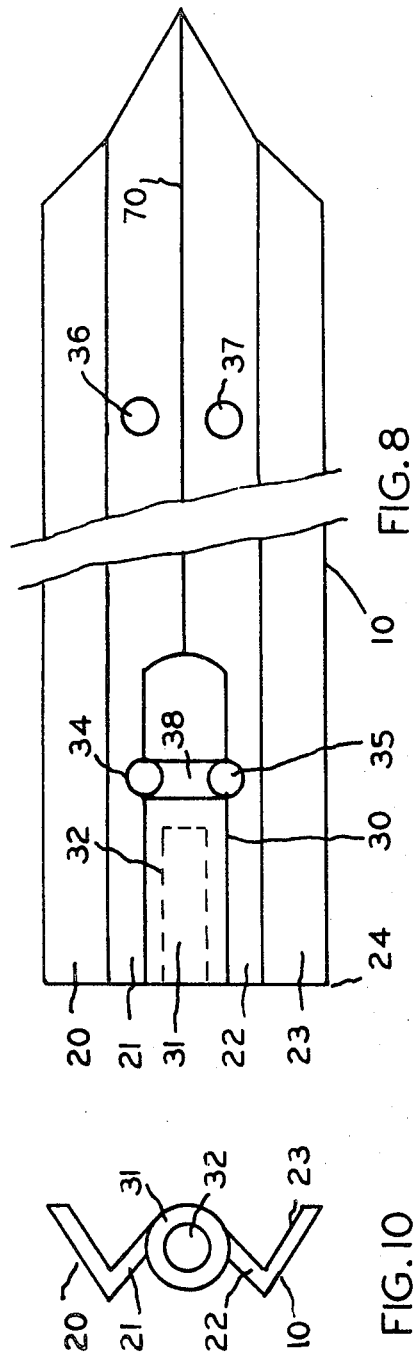
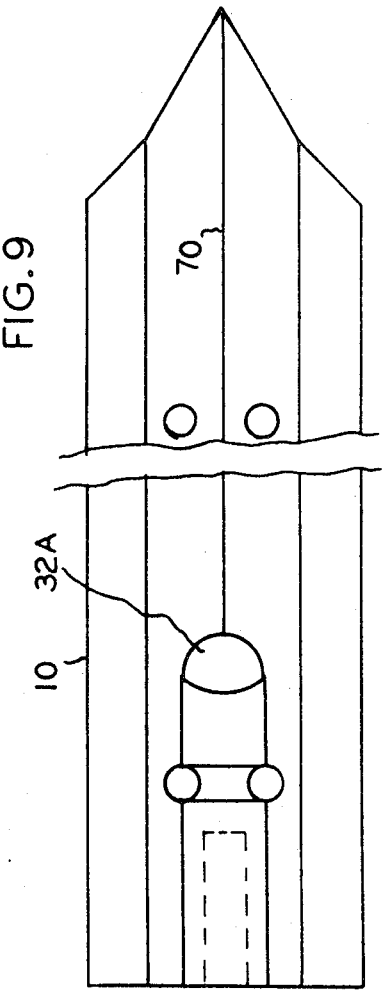
INVENTOR
THOMAS T. JONES JR.
BY
Richard J. Miller
ATTORNEY

United States Patent Office 3,468,085
Patented Sept. 23, 1969

3,468,085
MULTIPURPOSE GUY STAKE
Thomas T. Jones, Jr., 856 Magarian Road,
Fallbrook, Calif. 92028
Filed Sept. 14, 1967, Ser. No. 668,304
Int. Cl. E02d 5/80
U.S. Cl. 52—155                                3 Claims

ABSTRACT OF THE DISCLOSURE

There is provided herein an improved multipurpose guy stake incorporating therein a W-shaped cross-sectional construction having a V tip and a spindle of cylindrical cross-section mounted on the body which incorporates therein a plurality of devices for driving the stake into the ground and for removing it.

---

The invention described herein may be manufactured and used by or for the Government of the United States of America for governmental purposes without the payment of any royalties thereon or therefor.

This invention relates to a guy stake and more particularly to an improved multipurpose guy stake adaptable for utilization in a variety of settings.

One of the problems encountered in portable equipment particularly that utilizing an antenna needing guy wires is that the equipment must be adaptable for utilization in a plurality of environments. Guying such an antenna in loose sandy soil or very hard soil has proved a difficult problem to the installer when only one type of stake is supplied for all types of soil. The invention disclosed herein is particularly adapted for use in hard or soft soil by the features incorporated therein.

It is an object of this invention to provide an improved multipurpose guy stake.

It is a further object of this invention to provide a guy stake having means for driving it well below the surface of the ground and at the same time means for driving it to a lesser depth.

It is yet a further object of this invention to provide a means for removing a guy stake which has been driven totally below the surface of the ground.

Other objects, advantages and novel features of the invention will become apparent from the following detailed description of the invention when considered in conjunction with the accompanying drawings wherein:

FIGURE 1 shows the invention incorporated in a stake inserted in the ground in loose soil.

FIGURE 2 is a side view of the stake driver cap;

FIGURE 3 is a side view of the stake driver cap;

FIGURE 4 is a bottom view of the stake driver cap;

FIGURE 5 is a side view of the driver rod;

FIGURE 6 is a side view of the driver rod cap;

FIGURE 7 is an end view of the driver rod cap of FIGURE 6;

FIGURE 8 is a top view of a multipurpose stake;

FIGURE 9 is the bottom view of the multipurpose stake; and

FIGURE 10 is the end view of the multipurpose stake.

A multipurpose stake is shown in FIGURE 1, designated 10, after it has been driven below the level of ground 11 and has attached thereto a first cable 12 and a second cable 13 each terminating in eye bolts 14, 15 respectively. A driver stake 16 is shown having an end cap 17 thereon which was used for driving the stake into the ground but it has not yet been removed. A cable 18 connected to the eye bolt 15 represents the guying cable for an antenna (not shown). As discussed herein below the multipurpose stake 10 has first and second pairs of holes for attaching cables 12 and 13 thereto and in loose soil the cable 13 is attached to an antenna guying cable. It is to be noted that cable 13 is attached below the mid point of the stake 10 so that when tension is placed on cable 13, the stake is pulled and it distributes the load across stake 10 in a manner tending to rotate it in a counterclockwise direction and to dig itself further into the ground. It is to be understood of course that the drive rod 16 is removed after placing the stake in the loose soil as shown. When it is desirable to remove the stake, cable 12 and eye bolt 14 supply the necessary connection. By utilization of a jack or other means for hoisting, the stake 10 may be removed by tension being placed on cable 12 through eye bolt 14.

The detail of the multipurpose stake is shown in FIGURES 8, 9 and 10. In cross section the stake resembles a W having body portions 20, 21, 22, and 23, one end of said body portions along a line 24 is substantially a straight line, whereas the other end of the multipurpose stake is a wedge-shaped construction which is particularly adapted for driving into the ground. As shown, the device looks like an angle iron construction, however, it is to be understood that in actual practice this could be a rolled or bent member. In the stake there is provided a slot 30 into which there is welded a spindle 31. Down the central portion of spindle 31 extends a hollow passageway 32 whose purpose will be explained hereinafter. Four holes 34, 35, 36, 37 are provided in the stake for the passageway of cables 12 and 13, as shown in FIGURE 1. Spindle 31 has a recessed portion 38 which is provided co-located with holes 34, 35 so that the cable passing through holes 34, 35 and around spindle 31 provides a smooth, rounded surface for proper tensioning without injuring the cable.

The stake driver cap, shown in FIGURES 2, 3 and 4, designated generally as 40, has a substantially rectangular cross-sectional shape and has a recessed portion 41 extending substantially therethrough. In addition cap 40 has a cylindrical conical section 42 at the upper end of recess portion 41. A reinforced top 43 is provided for the purposes of receiving the blow of a sledge hammer in sinking a stake. The purpose of the conical section 42 is to postiion the stake driver cap about the multipuspose stake by inserting the conical section into the passageway 32 of the spindle 30 welded to stake 10. The size of the conical section is such that it is approximately the diameter of the passageway 32 so that the entire blow is absorbed across the entire end of stake 10.

The driver rod 16, as shown in FIGURE 5, is an elongated member, only a portion of which is shown which would be in the neighborhood of 4 to 5 feet in length. The reduced portion 50 has a diameter such as to fit into the spindle passageway 32. The cap section 17, shown in detail in FIGURES 6 and 7, has a hollow pasageway 60 which is approximately the size of the upper end of rod 16. Cap 17 is placed upon the rod to provide an enlarged surface for driving the rod and the stake into the ground.

The relative dimensions of the stake 10, shown in FIGURES 8, 9 and 10, can be varied depending upon certain conditions of design. In one successful embodiment of the invention holes 34 and 35 were approximately 1/10 of the distance along the stake measured from end line 24. The reason for this being that when the stake is used in hard or extremely firm soil it is driven into the ground with only one cable attached thereto and that is through the holes 34 and 35, the remainder of the stake is driven into the ground and it is desirable to have as much of the stake in the ground as possible. It should be pointed out that spindle 32 has an end at 32a which is tapered so that it does not prevent the stake from being driven further into the ground upon the spindle reaching the ground level.

Holes 36, 37 are positioned along the multipurpose stake farther than one-half its length, measuring from the end 24. The purpose of the position of these holes farther than one-half the distance is to provide a stake which when in soil and under a lateral pull, with regard to its longitudinal axis 70, tends to rotate the stake around that pull such as to bring the lower portion towards the load and hence dig the stake farther into the ground.

Obviously many modifications and variations of the present invention are possible in the light of the above teachings. It is therefore to be understood that the invention may be practiced otherwise than as specifically described.

I claim:

1. An improved guy stake for driving into the ground and attaching guy wires thereto, comprising:
   (a) A body portion having first, second, third, and fourth joined planar longitudinal members formed into a substantially W shape, one end of said stake being planar and substantially normal to a longitudinal axis of said stake, the other end of said stake being formed into a substantially V shape;
   (b) a slot extending along a portion of said longitudinal axis between said second and third members;
   (c) a spindle attached to said slot, said spindle having a cylindrical hollow passageway extending along a portion of its longitudinal axis, said spindle having a tapered end away from said planar end so that it does not impede entrance of the stake into the ground;
   (d) a recessed portion extending circumferentially around said spindle;
   (e) first and second holes in said second and third members positioned adjacent to said recessed portion of said spindle;
   (f) third and fourth holes in said second and third members positioned a distance greater than one-half the length of said stake measured from the planar end so that tension supplied through cables passing through said third and fourth holes when said stake is positioned in the ground, cause said stake to tend to rotate and dig itself deeper into the ground; and
   (g) a stake driver cap substantially rectangular in shape and having an open end adapted to receive said planar end of said stake and having a reinforced portion for providing a broader surface for driving said stake into the ground.

2. The device of claim 1 wherein there is provided a conical keying portion in said drive cap having a cross-sectional area which allows said keying portion to fit in said passageway in said spindle for providing means to centrally position said driver cap.

3. The device of claim 1 wherein there is provided an elongated member having a first end capable of being inserted in the passageway of said spindle and a second end to fit in said stake driver cap for driving said stake a considerable distance into the ground.

References Cited

UNITED STATES PATENTS

| | | | |
|---|---|---|---|
| 862,928 | 8/1907 | Myers | 52—165 X |
| 928,469 | 7/1909 | Miles | 135—15 |
| 1,308,940 | 7/1919 | Eggleston | 52—155 |
| 1,592,128 | 7/1926 | Steinbreder | 135—15 |
| 2,349,110 | 5/1944 | Potstada | 52—165 |
| 3,080,024 | 3/1963 | Clevett | 52—155 |
| 3,332,183 | 7/1967 | Ondrejka | 52—163 X |

FRANK L. ABBOTT, Primary Examiner

PRICE C. FAW, Jr., Assistant Examiner

U.S. Cl. X.R.

52—166